United States Patent
Marinkovic et al.

(10) Patent No.: US 8,868,945 B2
(45) Date of Patent: *Oct. 21, 2014

(54) DEVICE HAVING MULTIPLE GRAPHICS SUBSYSTEMS AND REDUCED POWER CONSUMPTION MODE, SOFTWARE AND METHODS

(75) Inventors: Sasa Marinkovic, Toronto (CA); Phil Mummah, Redwood City, CA (US); Mingwei Chien, Toronto (CA); Michael Tresidder, Newmarket (CA); Roumen Saltchev, Markham (CA); George Xie, North York (CA); Jason Long, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/762,812

(22) Filed: Apr. 19, 2010

(65) Prior Publication Data

US 2010/0293402 A1   Nov. 18, 2010

Related U.S. Application Data

(63) Continuation of application No. 11/421,005, filed on May 30, 2006, now Pat. No. 7,730,336.

(51) Int. Cl.
- G06F 1/32 (2006.01)
- G06F 3/14 (2006.01)
- G09G 5/36 (2006.01)

(52) U.S. Cl.
CPC ............ *G09G 5/363* (2013.01); *G09G 2360/06* (2013.01); *G06F 1/3218* (2013.01); *G06F 3/14* (2013.01); *G09G 2330/021* (2013.01)
USPC ............ 713/320; 345/502; 345/541; 345/545

(58) Field of Classification Search
CPC ........ G06F 1/3206; G06F 1/3265; G06T 1/60
USPC .......................... 345/502, 541, 545; 713/320
See application file for complete search history.

(56) References Cited

U.S. PATENT DOCUMENTS

| | | |
|---|---|---|
| 5,485,562 A | 1/1996 | Narayanaswami |
| 5,488,385 A | 1/1996 | Singhal et al. |

(Continued)

FOREIGN PATENT DOCUMENTS

| | | |
|---|---|---|
| CN | 1922596 A | 2/2007 |
| CN | 1922602 A | 2/2007 |

(Continued)

OTHER PUBLICATIONS

Chinese Patent Office Communication issued Oct. 18, 2010 in relation to Chinese Patent Application 200780027844.3, filed Jan. 22, 2009.

(Continued)

*Primary Examiner* — Albert Wang
(74) *Attorney, Agent, or Firm* — Faegre Baker Daniels LLP

(57) ABSTRACT

Many computing device may now include two or more graphics subsystems. The multiple graphics subsystems may have different abilities, and may, for example, consume differing amount of electrical power, with one subsystem consuming more average power than the others. The higher power consuming graphics subsystem may be coupled to the device and used instead of, or in addition to, the lower power consuming graphics subsystem, resulting in higher performance or additional capabilities, but increased overall power consumption. By transitioning from the use of the higher power consuming graphics subsystem to the lower power consuming graphics subsystem, while placing the higher power consuming graphics subsystem in a lower power consumption mode, overall power consumption is reduced.

25 Claims, 11 Drawing Sheets

(56) References Cited

U.S. PATENT DOCUMENTS

| | | | |
|---|---|---|---|
| 5,712,664 | A | 1/1998 | Reddy |
| 5,825,336 | A | 10/1998 | Fujita et al. |
| 5,896,141 | A | 4/1999 | Blaho et al. |
| 5,949,437 | A | 9/1999 | Clark |
| 6,018,340 | A | 1/2000 | Butler et al. |
| 6,040,845 | A | 3/2000 | Melo et al. |
| 6,046,709 | A | 4/2000 | Shelton et al. |
| 6,104,414 | A | 8/2000 | Odryna et al. |
| 6,208,361 | B1 | 3/2001 | Gossett |
| 6,532,019 | B1 | 3/2003 | Gulick et al. |
| 6,573,913 | B1 | 6/2003 | Butler et al. |
| 6,624,816 | B1 | 9/2003 | Jones, Jr. |
| 6,700,580 | B2 | 3/2004 | Lefebvre et al. |
| 6,760,031 | B1 | 7/2004 | Langendorf et al. |
| 6,850,240 | B1 | 2/2005 | Jones, Jr. |
| 6,864,891 | B2 | 3/2005 | Myers |
| 7,079,149 | B2 | 7/2006 | Main et al. |
| 7,420,565 | B2 | 9/2008 | Rubinstein et al. |
| 7,545,380 | B1 * | 6/2009 | Diard et al. ............ 345/505 |
| 7,721,118 | B1 * | 5/2010 | Tamasi et al. ............ 713/300 |
| 2001/0032321 | A1 | 10/2001 | Nanno et al. |
| 2003/0158886 | A1 | 8/2003 | Walls et al. |
| 2003/0189571 | A1 | 10/2003 | MacInnis et al. |
| 2003/0229748 | A1 | 12/2003 | Brewer et al. |
| 2005/0128205 | A1 | 6/2005 | Chow |
| 2005/0190190 | A1 | 9/2005 | Diard et al. |
| 2005/0228928 | A1 | 10/2005 | Diamond |
| 2005/0237327 | A1 | 10/2005 | Rubinstein et al. |
| 2005/0237329 | A1 * | 10/2005 | Rubinstein et al. ......... 345/531 |
| 2005/0244131 | A1 | 11/2005 | Uehara |
| 2005/0285863 | A1 | 12/2005 | Diamond |
| 2006/0007203 | A1 | 1/2006 | Chen et al. |
| 2006/0267987 | A1 | 11/2006 | Litchmanov |
| 2007/0283175 | A1 | 12/2007 | Marinkovic et al. |
| 2008/0034238 | A1 | 2/2008 | Hendry et al. |

FOREIGN PATENT DOCUMENTS

| | | |
|---|---|---|
| JP | 11-109937 | 4/1999 |
| JP | 2003-233780 | 8/2003 |
| JP | 3107450 | 2/2005 |
| JP | 2005316176 | 11/2005 |
| JP | 2007-179225 | 7/2007 |
| KR | 1020040094646 A | 11/2004 |

OTHER PUBLICATIONS

Japanese Office Action mailed Nov. 29, 2011, in related Japanese Application No. 2009-513431 filed Nov. 26, 2008 (partial translation).
Brier, Jeffrey A., USPTO Office Communication dated Jan. 23, 2008, in related U.S. Appl. No. 11/136,483, filed May 24, 2005.
Brier, Jeffrey A., USPTO Office Communication dated Sep. 30, 2008, in related U.S. Appl. No. 11/136,483, filed May 24, 2005.
Brier, Jeffrey A., USPTO Office Communication dated Jun. 15, 2010, in related U.S. Appl. No. 11/136,483, filed May 24, 2005.
Wang, Robert C., USPTO Office Communication dated Nov. 28, 2008, in related U.S. Appl. No. 11/421,005, filed May 30, 2006.
Wang, Robert C., USPTO Office Communication dated Aug. 5, 2009, in related U.S. Appl. No. 11/421,005, filed May 30, 2006.
Wang, Robert C., USPTO Office Communication dated Jan. 19, 2010, in related U.S. Appl. No. 11/421,005, filed May 30, 2006.
Wang, Robert C., USPTO Office Communication dated Mar. 18, 2010, in related U.S. Appl. No. 11/755,625, filed May 30, 2007.
Wang, Robert C., USPTO Office Communication dated Dec. 8, 2011, in related U.S. Appl. No. 11/755,625, filed May 30, 2007.
Wang, Robert C., USPTO Office Communication dated Apr. 25, 2011, in related U.S. Appl. No. 11/755,625, filed May 30, 2007.
Wang, Robert C., USPTO Office Communication dated Nov. 29, 2011, in related U.S. Appl. No. 11/755,625, filed May 30, 2007.
Wang, Robert C., USPTO Office Communication dated May 11, 2012, in related U.S. Appl. No. 11/755,625, filed May 30, 2007.
Perromat, Carlos, USPTO Office Communication dated Feb. 3, 2011, in related U.S. Appl. No. 11/987,559, filed Nov. 30, 2007.
Perromat, Carlos, USPTO Office Communication dated Oct. 5, 2011, in related U.S. Appl. No. 11/987,559, filed Nov. 30, 2007.
Perromat, Carlos, USPTO Office Communication dated May 1, 2012, in related U.S. Appl. No. 11/987,559, filed Nov. 30, 2007.
International Search Report mailed Mar. 17, 2009, in related PCT Application No. PCT/US2008/085160.
EPO Office Communication dated Nov. 16, 2009, in related European Application No. 07784220.1, filed May 30, 2007.
Extended European Search Report mailed Feb. 15, 2012, in related European Application No. 11190823.2, filed May 30, 2007.
EPO Office Communication dated Nov. 16, 2011, in related European Application No. 08856301.0, filed Dec. 1, 2008.
Extended European Search Report dated Jan. 27, 2012, in related European Application No. 11190822.4, filed May 30, 2007.
Extended European Search Report dated Feb. 8, 2012, in related European Application No. 11190830.7, filed May 30, 2007.
Chinese Office Action mailed Apr. 28, 2012, in related Chinese Application No. 200880125863.4, filed Jul. 29, 2010.
Extended European Search Report dated Aug. 2, 2012, in related European Application No. 11190830.7, filed May 30, 2007.
Extended European Search Report dated Sep. 21, 2012, in related European Application No. 11190822.4, filed May 30, 2007.
Japanese Patent Office, Office Action mailed Apr. 27, 2013, in related Japanese Patent Application No. 2010-536221.
Sony Vaio SZ330—Notebook Reviews by Mobile Tech Review; http://mobiletechreview.com/notebooks/Sony-Vaio-SZ330.htm; Apr. 27, 2009.
International Search Report from European Patent Office; International Application No. PCT/US2007/069969; dated Dec. 6, 2007.
Architecture of the Windows Driver Foundation; Microsoft Corporation White Paper; May 10, 2006.
Chinese Patent Office, Office Action mailed Oct. 14, 2013, in related Chinese Patent Application No. 200880125863.4.
Korean Patent Office, Office Action mailed Oct. 21, 2013, in related Korean Patent Application No. 2008-7032024.
EP Office Action; EP Application No. 08856301.0; from European Patent Office; dated May 28, 2013.

* cited by examiner

DEVICE HAVING MULTIPLE GRAPHICS SUBSYSTEMS AND REDUCED POWER CONSUMPTION MODE, SOFTWARE AND METHODS

CROSS-REFERENCE TO RELATED APPLICATIONS

This application is a continuation of U.S. patent application Ser. No. 11/421,005, filed May 30, 2006, the contents of which are hereby incorporated herein by reference.

FIELD OF THE INVENTION

The present invention relates generally to reducing power consumption in electronic devices and more particularly to a method for lowering the power consumption in devices having multiple graphics processors, and associated devices and software.

BACKGROUND OF THE INVENTION

Many electronic devices, such as conventional computing devices now include graphics subsystems capable of rendering two and three dimensional graphics; decoding and encoding motion video; and the like. To provide these features and desired processing speeds, modern graphics subsystems include an ever increasing number of transistors. Not surprisingly, the increase in transistor counts has led to corresponding higher electric power consumption by the graphics subsystems.

As a consequence, the fastest and feature-rich graphics subsystems have, for the most part, been reserved for devices that can meet the increased power demands. Portable computing devices, such as laptops, personal digital assistants, video and audio players, cellular telephones, and the like have often been equipped with functionally limited, but electrically efficient (i.e. lower power) components.

Often these graphics subsystems are integrated in other computing components such as processor interconnect circuits (often referred to as "chipsets").

Recently, there has been a trend to provide graphics features and performance that rival those of stationary computers for portable devices. Often, this is done by allowing the addition of an optional, external high power graphics subsystem to portable devices. The PCI express (PCIe) standards, for example, contemplates interconnection of PCI express compliant graphics cards, including a graphics subsystem, as external components to laptop computing devices.

At the same time, advances in other computing features, such as wireless components, large displays, and the like, have created demand for longer battery life to power portable devices and notebook computers.

One way of extending battery life is to temporarily reduce the power consumed. The total amount of power that a device consumes is determined by the individual power demands of device components. For example, the central processing unit (CPU), hard disk drive (HDD), and graphics subsystem all have individual power demands.

Accordingly, power reduction techniques include clock gating, voltage throttling, and resource hibernation. Clock gating reduces consumed power by reducing transistor and capacitor switching activity. This is accomplished by allowing a circuit in an electronic device to control whether or not, and at what speed, the clock signal reaches idle circuits in the processor.

Voltage throttling reduces overall power consumption by lowering the supply voltage to a processor in an electronic device. Supply voltage reductions are generally done in tandem with reductions in clock frequencies.

Resource hibernation allows particular components of an electronic component to be powered down, placed into a "sleep mode", or otherwise placed in a lower power consumption mode during periods of inactivity. The Advanced Configuration and Power Interface (ACPI) specification, for example, defines a number of different device power states that may be combined to reduce the overall power consumed.

Optimizing the balance between delivering high performance and conserving battery life continues to present challenges. Accordingly, there remains a need for methods and apparatus that lower the power consumption associated with graphics processing in electronic devices and computers.

SUMMARY OF THE INVENTION

Many computing device may now include two or more graphics subsystems. The multiple graphics subsystems may have different abilities, and may, for example, consume differing amount of electrical power, with one subsystem consuming more average power than the others. The higher power consuming graphics subsystem may be coupled to the device and used instead of, or in addition to, the lower power consuming graphics subsystem, resulting in higher performance or additional capabilities, but increased overall power consumption. By transitioning from the use of the higher power consuming graphics subsystem to the lower power consuming graphics subsystem, while placing the higher power consuming graphics subsystem in a lower power consumption mode, overall power consumption is reduced.

In accordance with an aspect of the present invention, there is provided an electronic device including a first graphics subsystem operable to render graphics, a second graphics subsystem operable to render graphics and a display in communication with both the first graphics subsystem and the second graphics subsystem and a processor. The processor executes processor executable instructions causing the processor to transition the electronic device from a first mode in which the second graphics subsystem renders graphics on the display, to a second mode in which the first graphics subsystems renders graphics on the display, and the second graphics subsystem is placed in a lower power consumption mode.

In accordance with another aspect of the present invention, there is provided a method of operating a computing device having first and second graphics subsystems. The method includes in a higher power consumption mode, rendering graphics for display on an interconnected display using the second graphics subsystem, and executing software to: detect a desired low power consumption mode of the computing device; place the second graphics subsystem in a lower power consumption mode in response to detecting the desired low power mode; and configure the first graphics subsystem to render graphics on the interconnected display, while the second graphics subsystem is in the low power consumption mode.

In accordance with yet another aspect of the present invention, there is provided a method of operating a computing device having first and second graphics subsystems. The method includes in a lower power consumption mode, rendering graphics for display on an interconnected display using the first graphics subsystem, and executing software to detect a desired higher power consumption mode of the computing device, place the second graphics subsystem in a higher power consumption mode in response to detecting the desired higher power consumption mode and configure the second graphics subsystem to render graphics on the interconnected display.

In accordance with yet another aspect of the present invention, there is provided a portable computing device including a housing containing a DC power supply, a display, a central processor, a first graphics subsystem and memory on a motherboard. A peripheral expansion slot is formed within the housing. A second graphics subsystem is on a peripheral expansion card in the peripheral expansion slot. The memory stores power management software, that when executed transitions the second graphics subsystem on the peripheral expansion card from a high power consumption mode in which the graphics subsystem on the peripheral expansion card is rendering graphics to a low power consumption mode, and renders graphics using the first graphics subsystem, in response to sensing a desired low power mode.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
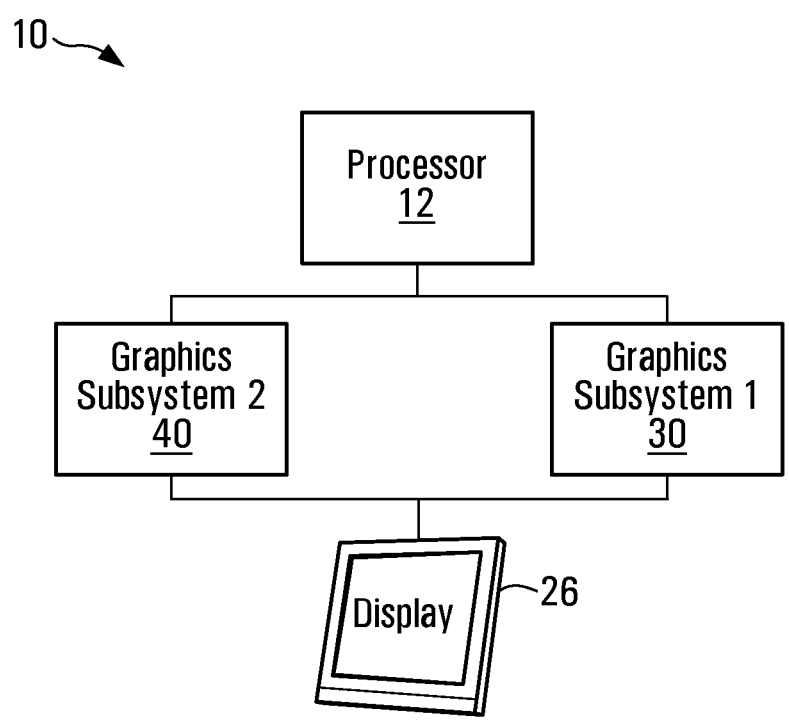
FIG. 1 is a simplified schematic block diagram of a computing device, exemplary of an embodiment of the present invention.

FIG. 1 is a simplified, high level, block diagram of an electronic device 10, including two graphics subsystems 30 and 40 and a display 26. As will become apparent, each graphics subsystem 30, 40 includes specialized electronic circuits capable of rendering computer graphics, in the form of one or more of 2D graphics, 3D graphics, decoded motion video or the like.

One graphics subsystem 40 consumes higher average power than the other graphics subsystem 30. Typically, graphics subsystem 40 that consumes the higher average power has greater graphics rendering capability than graphics subsystem 30. Graphics subsystem 40 may, for example, be able to render 2D or 3D graphics at a higher frame rate than the graphics subsystem that consumes the lower average power. Similarly, the graphics subsystems 30, 40 need not have identical capabilities. Graphics subsystem 40 typically includes more functional blocks than graphics subsystem 30.

Both graphics subsystem 30 and 40 are physically or logically coupled to the same display 26, on which rendered graphics are displayed. Exemplary of embodiments of the present invention, device 10 may switch from a higher power consumption mode, in which graphics to display 26 are rendered by higher power consumption graphics subsystem 40 to a lower power mode in which graphics to display 26 are rendered by lower power consumption graphics subsystem 30, and graphics subsystem 40 is partially, completely or substantially disabled.

Conveniently, the transition from the high power mode to the low power mode is effected dynamically, without requiring device 10 to power cycle (i.e. power down and restart), and may be effected by processor 12, under software control. In this context, software may include firmware, device driver, DIOS and the like.

The invention may form part of virtually any electronic device that includes two graphics subsystems. As such, device 10 could take the form of a desktop computing device, a portable computing device (including a laptop computer, PDA, mobile telephone, video or audio player, media center, or the like).

In an exemplified embodiment described below, an embodiment of the invention is disclosed as forming part of a mobile (laptop) computing device.

Figure 2:
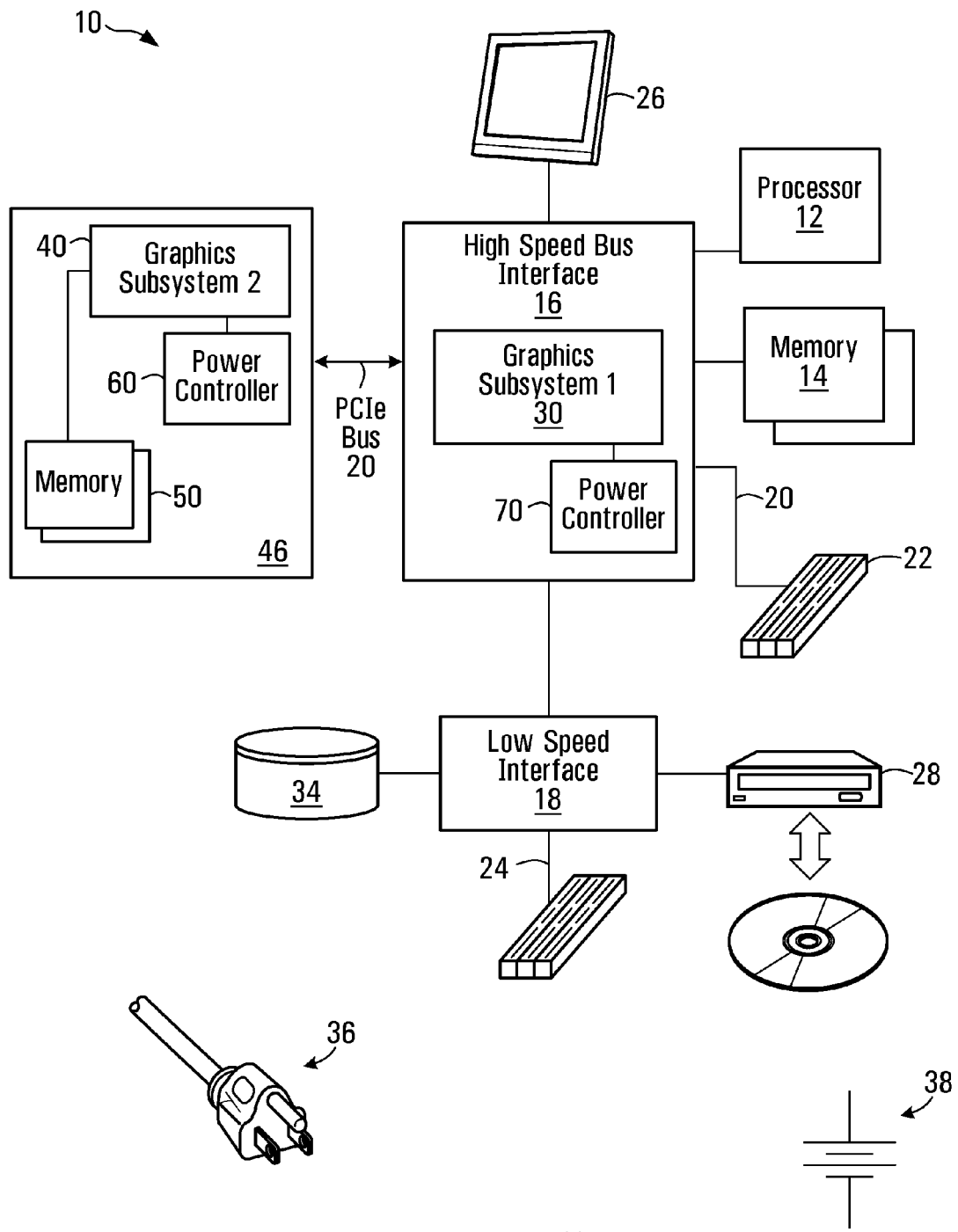
FIG. 2 is a simplified schematic block diagram of a computing device, exemplary of an embodiment of the present invention.

Specifically, FIG. 2 is a simplified block diagram of a specific mobile computing device 10, exemplary of an embodiment of the present invention. Depicted device 10 shown in FIG. 1 is a computing device based on the conventional Intel x86 computer architecture. However, a person of ordinary skill will readily appreciate that the invention may be embodied in computing devices having other architectures, such as the PowerPC architecture, an AMD x86, or other known architectures.

As illustrated, example device 10 includes processor 12 formed as a central processing unit (CPU), host memory 14, and peripherals which are all interconnected through integrated interface circuits 16 and 18 (also referred to as north bridge 16 and a south bridge 18). All these may be formed on a motherboard.

Interface circuit 16 is a high speed interface and interconnects CPU 12, memory 14, and peripherals by way of a high speed expansion bus 20. Interface circuit 16 further interconnects CPU 12 to a lower speed interface circuit 18. One or more peripheral expansion slots 22 may be interconnected to interface circuit 16 by way of high speed expansion bus 20. An exemplary high speed expansion bus 20 is the PCI express (PCIe) bus that has a bandwidth in the gigabyte per second range, and allows data transfer reads and writes at this bandwidth.

Interface circuit 16 further includes a first graphics subsystem 30, embodied as an integrated graphics processor (IGP), suitable for generating video signals for display on display 26, which may be in the form of a monitor, LCD panel, television or the like.

An additional second graphics subsystem 40, forms part of device 10. In the exemplified embodiment, graphics subsystem 40 is embodied as an external graphics processor formed on a peripheral expansion card 46. Peripheral expansion card 46 is also connected to interface circuit 16 by way of expansion slots 22 on expansion bus 20. As will become apparent, by providing second graphics subsystem 40, device 10 may provide expanded graphics capabilities, not otherwise present in device 10. Graphics memory 50, for use as a frame buffer by second graphics subsystem, may be contained on the peripheral expansion card 46. Similarly, a power controller 60 in communication with graphics subsystem 40 may optionally be formed on expansion card 46, and may control operation of graphics subsystem 40. Specifically, power controller 60 may throttle clocks, such as memory and pixel clocks, used by components of graphics subsystem 40; disable (or disconnect) functional blocks of graphics subsystem 40; lower voltages applied to portions of graphics subsystem 40; or otherwise place subsystem 40 in one or more modes in which power consumption is reduced, in known manners.

Another optional power controller 70 may be in communication with first graphics subsystem 30, and may throttle clocks, such as memory and pixel clocks, used by components of graphics subsystem 30; disable (or disconnect) functional blocks of graphics subsystem 30; lower voltages applied to portions of graphics subsystem 30; or otherwise place subsystem 30 in one or more modes in which power consumption is reduced, in known manners.

Although exemplified graphics subsystem 40 is formed on peripheral expansion card 46, a person of ordinary skill will readily appreciate that graphics subsystem 40 could just as easily be formed on the motherboard of device 10, or elsewhere.

Graphics subsystem 33 and 40 may originate with the same vendor/manufacturer or with different vendors/manufacturers. Interface circuit 18 interconnects lower speed peripherals and interconnects, such as an optical disk drive 28, and persistent storage memory 34 in the form of a hard drive by way of integrated IDE/SATA ports (not shown) and printers, and other peripherals by way of parallel or USB ports (not shown). Yet other peripherals may be interconnected by way of a lower speed expansion bus 24, compliant for example, with known PCI or ISA standards. Other components such as sound cards and networking interfaces (not shown) may similarly be interconnected to interface circuit 18 by way of low speed expansion bus 24, or otherwise.

As noted, device 10 may conveniently be formed as a portable computing device in the form of a laptop or smaller computing device. As such, a single housing may contain a DC power source 38, display 26 and the above mentioned motherboard and components. The second graphics subsystem 40 may be added to a single housing that houses the remainder of the computing device, or may form part of a docking station that only forms part of device 10, when device 10 is physically interconnected thereto.

Device 10 may be operated in at least two power consumption modes: a higher power consumption mode and a lower power consumption mode. In the depicted embodiments, device 10 the higher power mode may be assumed when device 10 is powered by a power source 36 connected to an AC (mains) supply; the lower power consumption mode may be assumed when device 10 is powered by a DC power source 38 using one or more batteries, fuel cells, or the like. Alternatively, power consumption modes may be user selected, software controlled, based on for example, user preferences, types of software applications being executed, battery levels, and the like, or otherwise chosen.

Figure 3:
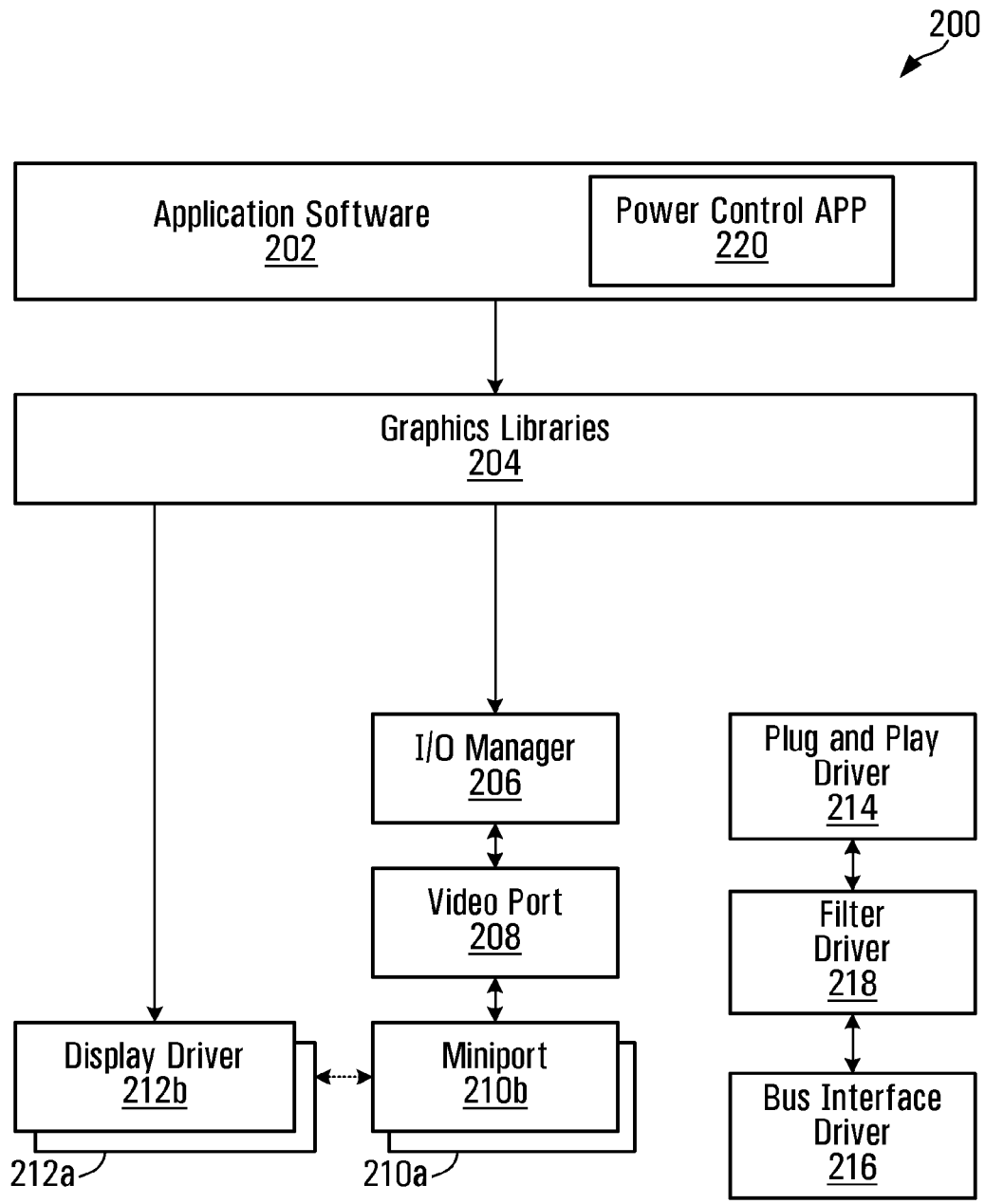
FIG. 3 is a simplified functional block diagram of exemplary software at the computing device of FIG. 2.

In the depicted embodiment, device 10 executes software 200 stored within system memory, as illustrated in FIG. 3. System memory includes persistent storage memory 34 and host memory 14 (FIG. 2) and may further include a suitable combination of additionally random access memory, read-only memory and disk storage memory, used by device 10 to store and execute software 200. Exemplary software 200 could, for example, be stored in read-only memory or loaded from an external peripheral such as a disk drive 28 (FIG. 1), or over a computer network (not illustrated).

In the illustrated embodiment, software 200 is based on the Microsoft Windows XP platform. However, software operate device 10, in manners exemplary of embodiments of the present invention need not be based on this platform. Instead, exemplary software may work in conjunction with other known computer operating system, such as the Linux, MacOSX, Microsoft Windows Vista, or other operating systems. With different operating systems, the software architecture may be materially different from that depicted in FIG. 2.

As illustrated in FIG. 3, the exemplified software 200 includes application software 202, graphics libraries 204, input/output manager 206, video port 208, and hardware driver programs 210a, 210b, 212a, 212b, 214 and 216 adapting device 10 to operate in manners exemplary of embodiments of the present invention. Example software 200 is specific to the Microsoft Windows Platform. Of course, software 200 may include other software components, in the form of libraries, functional blocks, drivers and the like, not specifically detailed in FIG. 3, but apparent of those of ordinary skill.

In a Windows XP operating system environment, low level control of hardware components, such as graphics subsystems 30, 40 is typically controlled by software modules commonly referred to as drivers. Operation of each hardware component is controlled by one or more such drivers. As will become apparent, some drivers may further be abstracted into multiple components, to facilitate their creation. For clarity, only a few drivers and driver components (i.e. drivers 210a, 210b, 212a, 212b, 214 and 216) are depicted. Of course, the exact number and types of driver components will depend in large part on the complete hardware configuration of device 10. Driver architecture, in the context of the Windows XP operating system is, for example, described more particularly in Architecture of the Windows Driver Foundation (May 10, 2006), available from www.microsoft.com/whdc/driver/wdf/wdf-arch.mspx, the contents of which are hereby incorporated by reference.

Exemplary graphics libraries 204, input/output manager 206, video port 208 and plug and play driver 214 are typically provided as part of the Microsoft Windows operating systems. As such, exemplary graphics libraries 204 may include the Microsoft DirectX libraries, the GDI libraries, and the OpenGL libraries.

Software 200 is layered, with higher level layers using lower layers to provide certain functionality. So, application software 202 typically renders graphics by making calls to graphics libraries 204. Graphics libraries 204, in turn, use the Windows operating system and drivers to render the graphics using graphics subsystem 30 and 40.

Graphics libraries 204 communicate with operating system input/output manager 206, and driver components 212a and 212b (also referred to as display drivers 212). Input/output manager 206, communicates with an operating system video port 208. Video port 208 and display drivers 212 in turn, communicate with driver components 210a and 210b (also referred to as mini-port components 210). Video port 208 contains only generic, hardware-independent code that is common to all third party video drivers.

Software 200 further includes two separate drivers 212a and 212b, and two separate mini-port components 210a and 210b: one driver 212a and one mini-port components 210a provide low-level communication with, and control of graphics subsystem 30 and the other driver 212b and mini-port component 210*b* provide low level communication with/control operation of graphics subsystem 40. Each mini-port component 210*a* and 210*b* and driver 212*a*, 212*b* is specific to an installed one of graphics subsystem 30 and 40, and is typically provided by the same vendor. Display drivers and mini-port components 212*a*, 212*b* and 210*a*, 210*b* are particular to the Windows XP and similar architecture and are tightly coupled. Mini-port component 210 is in communication with operating system video port portion 208, supplied with the Windows operating system. Mini-port components 210 allow processor 12 to manage state changes of graphic subsystems 30 and 40; manage cursor or pointer hardware located on the graphic subsystems 30, 40; make video frame buffer available to the software applications 206, and driver components 212 and the like. In the Windows XP architecture, the mini-port components 210*a* and 210*b* are not used to execute rendering instructions. Instead, rendering is performed by video drivers 212 that may be in communication with graphics libraries 204.

Additional hardware driver components 214 used by operating system to control operation of bus 20, are also depicted in FIG. 3. As illustrated, driver software includes plug-and-play driver 214 and PCIe bus interface driver component 216. Further, plug-and-play driver 214 is supplied with the Windows XP or similar operating system. Plug-and-play driver 214 is used to report the presence of new hardware added to device 10, while computing device 10 is on, to the remainder of the Windows operating system and dynamically load and unload drivers into system memory, as required. A further bus interface driver component 216 is depicted. Bus interface driver component 216 is entirely conventional, and is typically supplied by the supplier of interface circuit 16. Bus interface driver component 216 reports the presence of any peripheral devices on bus 20 to plug-and-play driver 214.

An additional filter application 218 is also depicted. As detailed below, filter application 218 intercepts messages from bus interface driver component 216, and may respond to queries about interconnected devices on bus 20.

Software, exemplary of embodiments of the present invention, may form part of graphics libraries 204, application software 206 (and in particular power control application 208) and/or driver components 210*a*, 210*b*, 212*a*, 212*b*, 214 and 216.

Figure 4:
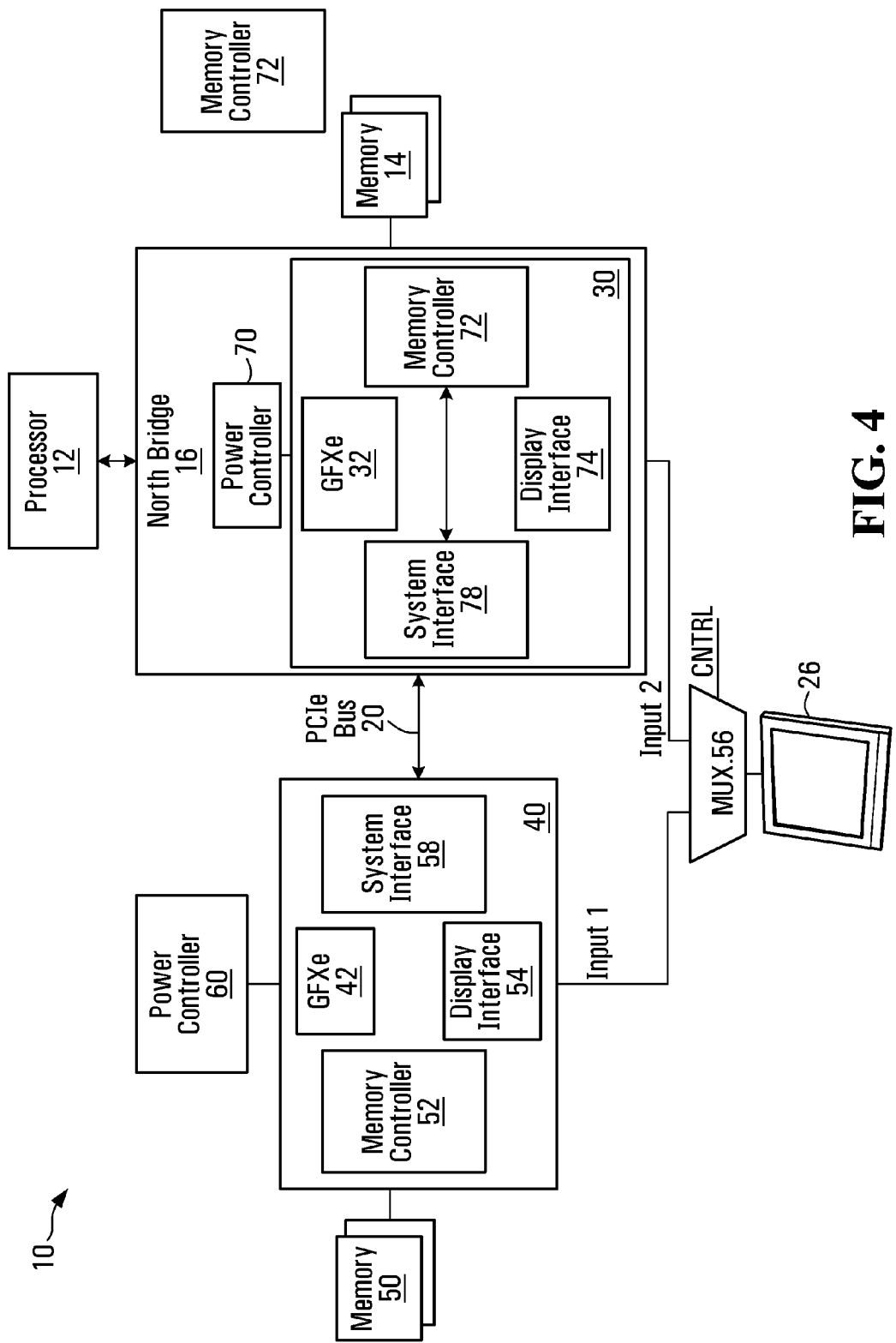
FIG. 4 is a further simplified schematic block diagram of portions of the computing device of FIG. 2.

FIG. 4 shows a further simplified block diagram of a portion of device 10 of FIG. 2. As illustrated, interface circuit 16 interconnects central processor 12 and system memory 14. Graphics subsystem 30 (embodied as a graphics processor on interface circuit 16) including graphics engine 32, a memory controller 72, a display interface 74, and a bus interface 78.

Graphics engine 32 is a functional block capable of rendering 2D graphics or 3D graphics decoding video, or the like. As will be appreciated, graphics subsystem 30 may include multiple graphics engines.

Memory controller 72 allows graphics subsystem 30 provide access to graphics memory and host memory 14. In the depicted embodiment, graphics memory used by graphics subsystem 30 forms part of host memory 14. However, a person of ordinary skill will readily appreciate that graphics subsystem 30 may include or be in communication with its own local memory. Bus interface 78 enables subsystem 30 to communicate over bus 20.

As will be appreciated, display interface 74 may be any suitable interface for converting data within a buffer for display on a display device 26 interconnected by port 78. For example, display interface 74 may take the form of a random access memory, digital to analog converter ("RAMDAC"). One or more video connectors allow interconnection of graphics subsystem 30 to one or more display devices, such as an LCD panel, monitor, television, or the like. Output port 78 may be in the form of VGA ports; composite video ports; DVI ports, LVDS ports, DVO ports, SDVO ports, or the like.

Graphics subsystem 40, (formed on peripheral expansion card 46 of FIG. 2), is also connected to interface circuit 16 by way of an expansion slot on high speed expansion bus 20. Graphics subsystem 40 includes graphics engine 42, a memory controller 52, bus interface 58, and display interface 54. Graphics subsystem 40 includes or is in communication with graphics memory 50.

Graphics engine 42, like graphics engine 32, is a functional block capable of rendering 2D graphics or 3D graphics decoding video, or the like. As will be appreciated, graphics subsystem may include multiple graphics engines. Possibly, graphics engine 42 may provide functions simply not provided by graphics engine 32.

Memory controller 52 allows graphics subsystem 40 to access memory 50 and host memory 14. Bus interface 58 enables graphics subsystem 40 to communicate over bus 20.

Display interface 54, by way of memory controller 52 samples a frame buffer in graphics memory 50 and presents an image at a video connector. In this way, images rendered by external graphics engine 42 in frame buffer in memory 50 may be displayed. The video connector may be connected directly to an external display, or to the motherboard of device 10, where video signals may be routed to an integrated display, or a connector for attaching an external display to device 10. Again, display interface 54 may be any suitable interface for converting data within a buffer for display on a display device 32 such as a RAMDAC, single-ended or differential transmitter, or the like.

As noted, a power controller 60 is in communication with graphics subsystem 40 and controls the power consumption of each or some of and one or more of display interface 54; memory controller 52; graphics engine 42; bus interface 58; and graphics memory 50, using conventional power consumption techniques, such as clock and voltage throttling, powering down, or otherwise disabling all or some of these components. Power controller 60 may be controlled by signals on bus 20 or otherwise, and may, for example be compliant with the ACPI standard.

Graphics subsystem 30 operates in much the same way as graphics subsystem 40. As such, graphics subsystem 30 uses memory controller 72 to access a frame buffer held in host memory 14 or in memory local to subsystem 30. This frame buffer is sampled by display interface 74 and an image is presented at video output connector, which could be directly connected to a display. In an effort to provide economical integrated components, graphics subsystem 30 provides limited functionality. For example, resolution, memory, graphics processor speed, 3D graphics abilities, and the like of graphics subsystem 30 may be relatively limited and may operate more slowly than external graphics processor 42 of graphics subsystem 40.

Higher performance computing and graphics may be provided by the optional add-on graphics subsystem 40. In the presence of graphics subsystem 40, graphics subsystem 40 may be directly physically connected to a first display device (such as a monitor, LCD display, or the like—not shown), while graphics subsystem 30 may be physically interconnected with a second display device to allow graphics subsystem 30 to drive a second interconnected display device 32. Microsoft Windows XP, for example, supports concurrent use of multiple physical displays, using the DualView option. By using multiple displays, application software 202 and the remainder of the operating system may render graphics to be presented concurrently to frame buffer in memory 50 and frame buffer in memory 14. Typically multiple displays are used in one of three configurations: in the first, identical images are rendered to both frame buffers; in the second a different image unrelated to the first is rendered on the different monitors, effectively giving an end-user two desktops for applications; in a third mode the two frame buffers may be treated as a single extended desktop. Existing operating systems may render images on each display, selectively in dependence on the nature and abilities of the interconnected graphics subsystem. Thus, for example, applications rendering three-dimensional graphics may do so using hardware acceleration on displays interconnected with a subsystem supporting such acceleration, for output to an interconnected display.

Computationally intensive graphics, such as three dimensional graphics, game graphics, and the like are more effectively performed by graphics subsystem 40. Use of add-on graphics subsystem 40 within device 10 therefore allows end-users to experience the latest in graphics intensive applications, such as games, computer aided design software, animation software, rendering software and the like. Conveniently, add-on graphics subsystem 40 may be chosen by an end-user, and replaced and kept current, as required. In the past, additional graphics computing power was only available on workstation computing devices. With the advent of expansion slots on mobile computing devices, such computing power is now available to owners of portable computers such as laptops. Of course, use of a higher (or different) performance graphics engine 42 on graphics subsystem 40 increases overall power consumption of device 10. This increased power consumption may not be sustainable on a computing device that is powered by a battery source.

At the same time, in the presence of an add-on graphics subsystem 40 with graphics engine 42, graphics subsystem 30 may be redundant. For example if multiple physical displays are not connected to device 10, graphics subsystem 30 may not play a role. Graphics subsystem 30 may therefore be disabled. Alternatively, in the presence of a power controller 70 controlling operation of graphics subsystem 30, graphics subsystem 30, when not in use may also be placed in a lower power mode. Again, power controller 70 may disable or disconnect portions of graphics subsystem 30, or clock or voltage throttle portions of graphics subsystem 30.

Exemplary of an embodiment of the present invention, software 200 serves to allow device 10 to selectively disable one higher power graphics subsystem 40, in the presence of subsystem 30.

To this end, and as shown in FIG. 4, computing device 10 further includes a switch 56. Switch 56 receives video signals generated by subsystem 40 and subsystem 30 at first and second inputs. Switch 56 may be any suitable video switch, such as a multiplexer, and is operable to present one of the conventional video signals at its two signal inputs at its video output connector. Presented video signals at the inputs of switch 56 may be conventional video signals such as digital signals (such as LVDS or TMDS formats or the like) or analog signals (such as VGA format). If switch 56 is configured to receive both digital and analog input signals, or provide video in either output, switch 56 may include a format converter. Moreover, switch 56 may include one or more video outputs to allow for connection either a digital or analog display device 32, or both.

Switch 56 further includes a control input (CNTRL). This control input controls which signal input is provided to the video output of switch 56. In the depicted embodiment, the control input is toggled by processor 12, by way of a general purpose input output (GPIO) interface (not illustrated), in response to detecting or determining a change in the power mode of device 10 is required or desired. As will become apparent, switch 56 is configured such that the conventional video signal generated by graphics subsystem 30 is selected if device 10 is operating in a low power consumption mode. Conversely, video signals generated by the higher performance external graphics subsystem 40 are selected for display if device 10 is operating in a higher power consumption mode. Similarly, power provided to graphics subsystem 40 or graphics subsystem 30, may be reduced or disabled. Switching may be effected dynamically, while device 10 is in use, without requiring device 10 to restart (i.e. cold or warm start).

To accomplish this, computing device 10 may also include at least one power controller 60, described above. In the depicted embodiment, power controller 60 forms part of the peripheral expansion card 46 carrying graphics subsystem 40. However, power controller 60 could just as well form part of motherboard of computing device 10, or as part of interface 16. If power controller 60 forms part of the expansion card 46, it may have greater flexibility to control operation of subsystem 40. If power controller 60 forms part of computing device 10, it may only have the ability to disable power to graphics subsystem 40.

Figure 5:
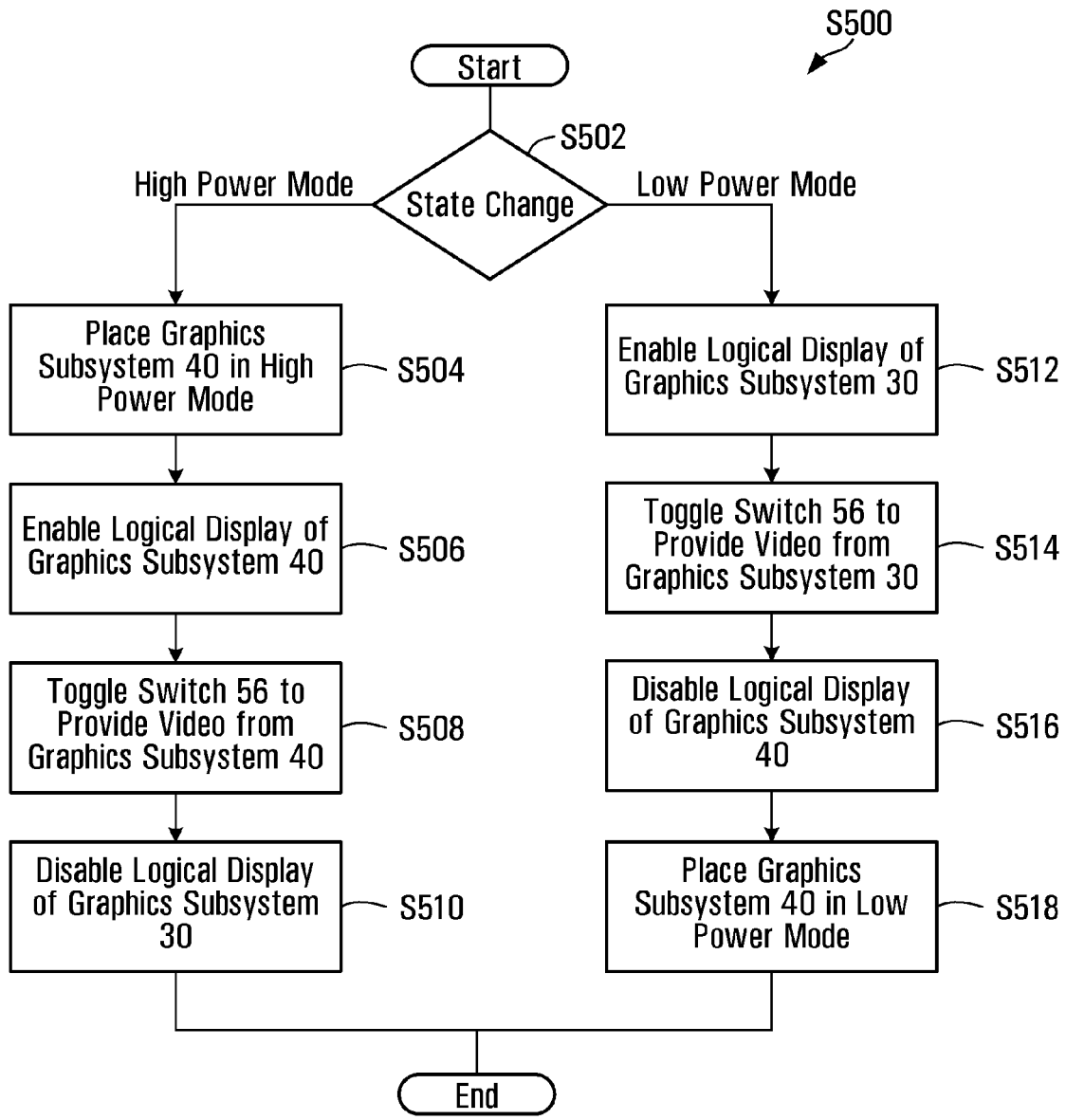
FIGS. 5 and 6 are flow charts detailing steps performed by software at the device of FIG. 2, exemplary of embodiments of the present invention.

Software 200 within system memory 12 is used in order to configure and control switch 56 and power controller 60. FIG. 5 is therefore a flow chart, illustrating exemplary software blocks S500 for switching device 10 between two available power consumption modes in exemplary of an embodiment of the present invention.

Prior to detailing blocks S500, a brief explanation of how drivers 210a, 210b, 212a, 212b, 214 and 216 conventionally control operation of an associated computing device (such as device 10) is worthwhile. Typically, after power-up of device 10, the operating system loads any drivers necessary for operation of device 10, including drivers 210a, 210b, 212a, 212b, 214 and 216. In the presence of two graphics subsystem 30 and 40, two display drivers 212a and 212b and mini-port components 210a, 210b are loaded. Components/drivers 210a, 210b, 212a, 212b further assess which displays are physically interconnected to graphics subsystems 30 and 40, and set appropriate state variables stored in memory (e.g. operating registry entries) identifying interconnected displays. These interconnected displays are logically enabled and may later be physically enabled by components/drivers 210a, 210b, 212a, 212b. Application software 202 then allows the activation of any interconnected, logically enabled, displays, and use of multiple adapters to behave as described above. Of course, if only a single display is connected to the two graphics subsystems 30, 40 only that subsystem may be activated. Application software 202, in the form of games, end-user application, and the like, operate through the operating system and components/drivers 210a, 210b, 212a, 212b, make use of those devices that are present. Accordingly, application software 202 may render images using resource provided by a currently available (or enabled) subsystem 30 or 40. As required, specific applications within application software 202 may cease operating in the absence of enabled hardware required for their operation.

Now, exemplary of embodiments of the present invention, the power state of device 10 is assessed when device 10 is initially powered up. Power control application 220 configures subsystem 30 and 40 and switch 56, as required and as detailed below.

Software blocks S500, exemplary of embodiments of the present invention, may be performed by processor 12 under control of power control application 220 within system memory 10. Blocks S500 may be performed each time device 10 undergoes a state change, for which graphics subsystems 30 and 40 should be configured accordingly. As illustrated, in block S502 power control application 220 determines whether device 10 should assume its higher power consumption mode, or its lower power consumption mode. In the example embodiment, the higher power consumption mode may be used when device 10 is operating from an AC power source 36; the lower power consumption mode may be used when device 10 is operated by way of a DC power supply 38, when the DC source 38 is low, or the like.

When device 10 is to resume (or transition to) its high power consumption mode, blocks S504-S510 are executed. In block S504 subsystem 40 is placed in its full operational (high power consumption) mode, if it is not already in this mode. This may be performed by providing an appropriate signal to power controller 60, by processor 12, for example, under control of mini-port driver component 210b. Next, subsystem 40 and any display attached are logically enabled in blocks S506 and S508. This may be performed by making API call to plug-and-play driver 214, allowing it to detect the presence of subsystem 40, and then enumerating the newly enabled device(s) to obtain the assigned name(s). Once the name is known, the operating system may be used to the newly enable subsystem 40 and interconnected display. Note "logically" enable and disable refers to configuring the operating system to use an associated graphics subsystem and device to render or not render graphics. In the Windows XP environment, a display may be enabled by enabling an extended desktop, with displays of subsystem 30 and 40 active.

Subsystem 30 and/or any display attached to it may be logically disabled in block S510. Finally, an appropriate API call is made to make the logical display of graphics subsystem 40, the primary (or sole) display recognized by the operating system.

Blocks S506 and S510 may be performed, by suitable operating system API calls, or otherwise by setting the appropriate memory storing state information. Additionally, switch 56 is toggled in step S508 so that output from graphics subsystem 40 is provided to interconnected display 26. Specifically, in the Windows XP environment, which logical displays are interconnected may be assessed using the known EnumDisplayDevices ( ) call. Thereafter, to switch from one graphics subsystem to another, a graphics subsystem (30 or 40) may be logically enabled by logically enabling two displays (and thus graphics subsystems) and thereafter only a single display, using the ChangeDisplaySettingsEX ( ) API call.

This will logically enable both graphics subsystem and thus the one that was disabled. The mode to set is extended desktop mode. Graphics subsystem 30 may then be logically disabled in the same manner. Optionally, driver 210b may trap any queries about the state of graphics subsystem 30, so that the remainder of the operating system perceives graphics subsystem 30, as disabled or absent.

When device 10 is to transition to, or resume its low power consumption mode, blocks S512-S518 are executed. Broadly speaking, graphics subsystem 40 is disabled and placed in its low power consumption mode, while graphics subsystem 30 is enabled. To do so, graphics subsystem 30 is enabled in blocks S512 and S514. Again, this may be performed by logically enabling the graphics subsystem 30 through its associated driver 210a, and making appropriate API calls (as described above with reference to block S506) in block S512, and logically disabling subsystem 40, in block S514 in the same manner as subsystem 30 was disabled in step S510. Blocks S512 and S514 may again be performed, by appropriate operating system API calls, such as the EnumDisplayDevices ( ) and ChangeDisplaySettingsEX ( ) calls described above, or direct communication with hardware.

After the display is logically disabled, API calls to driver 212 may be used to physically place graphics subsystem in its low power mode in block S518. As such, processor 12 provides a suitable signal to power controller 60 placing graphics subsystem 40 in its low power state. In its simplest form, power controller 60 disconnects power to graphics subsystem 40, or components of graphics subsystem 40. Alternatively, power control application 220 may instruct power controller 60 to place graphics subsystem 40 to enter into a lower power sleep mode, such as the one of the device power states defined by the ACPI specification. In any event, in this lower power consumption mode, voltages are throttled, and/or all or parts of adapter 40 are powered down and/or selected clocks used by adapter 40 are slowed.

Once graphics subsystem 30 is enabled, other ones of applications 202 through driver/component 210a and 212a continue to render graphics through graphics subsystem 30.

Additionally, in the depicted embodiment, the powering down of graphics subsystem 40 in block S518 could cause interface driver 216 (FIG. 3) to signal, in response to a query or otherwise, the absence of graphics subsystem 40 on bus 20 to plug and play driver 214. Without further modification to drivers and components 212, 210, plug and play driver 214 would, in response, free resources allocated for the bus link between bus interface 16 and graphics subsystem 40. Should this happen, repowering graphics subsystem 40 would cause interface 16, under control of plug and play driver 214 and bus driver component 216 to newly negotiate a link over bus 20. Resources such as memory address space, interrupts, and the like would accordingly be re-allocated.

Figure 6:
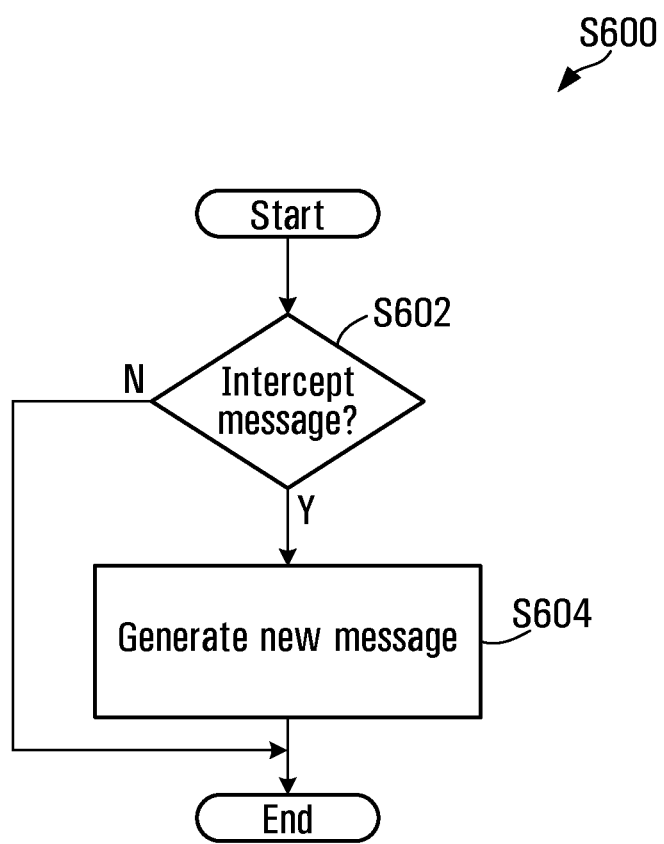

Therefore, in order to avoid unnecessary link negotiation, software filter application 218 handles any messages that are directed to plug-and-play driver 214, generated by bus interface driver 216, as depicted in steps S600 of FIG. 6. Any messages identifying the low power mode or absence of graphics subsystem 40 notifying plug-and-play adapter that graphics subsystem 40 is no longer active, are intercepted in block S602. Each such message is replaced with a message indicating graphics subsystem 40 is actually active, generated in step S604. In this way, plug and play driver 214, and bus driver 216 do not become aware of the lower (or no) power state of graphics subsystem 40, and therefore do not free resources associated with the link connecting graphics subsystem 40 to interface 16 over bus 20.

Advantageously, configuring switch 56 and graphics subsystem 40 and graphics subsystem 30 as described, reduces power consumption and causes device 10 to consume power required for only one of the two graphics processors thereby reducing overall energy consumption and conserving battery life. For example, portable computers are typically used in a battery operated mode (DC power) by business travellers. The typical usage pattern of such users while travelling will include word processing, presentation and email applications. These applications do not require the heavy duty graphics acceleration that is provided by an external graphics subsystem 40. Transitioning from the use of a second (e.g. external) graphics subsystem 40 to use of a first (e.g. integrated) graphics subsystem 30, having lower average power consumption, aids in balancing between high performance graphics processing and lower power consumption without sacrificing overall system performance.

Figure 7:
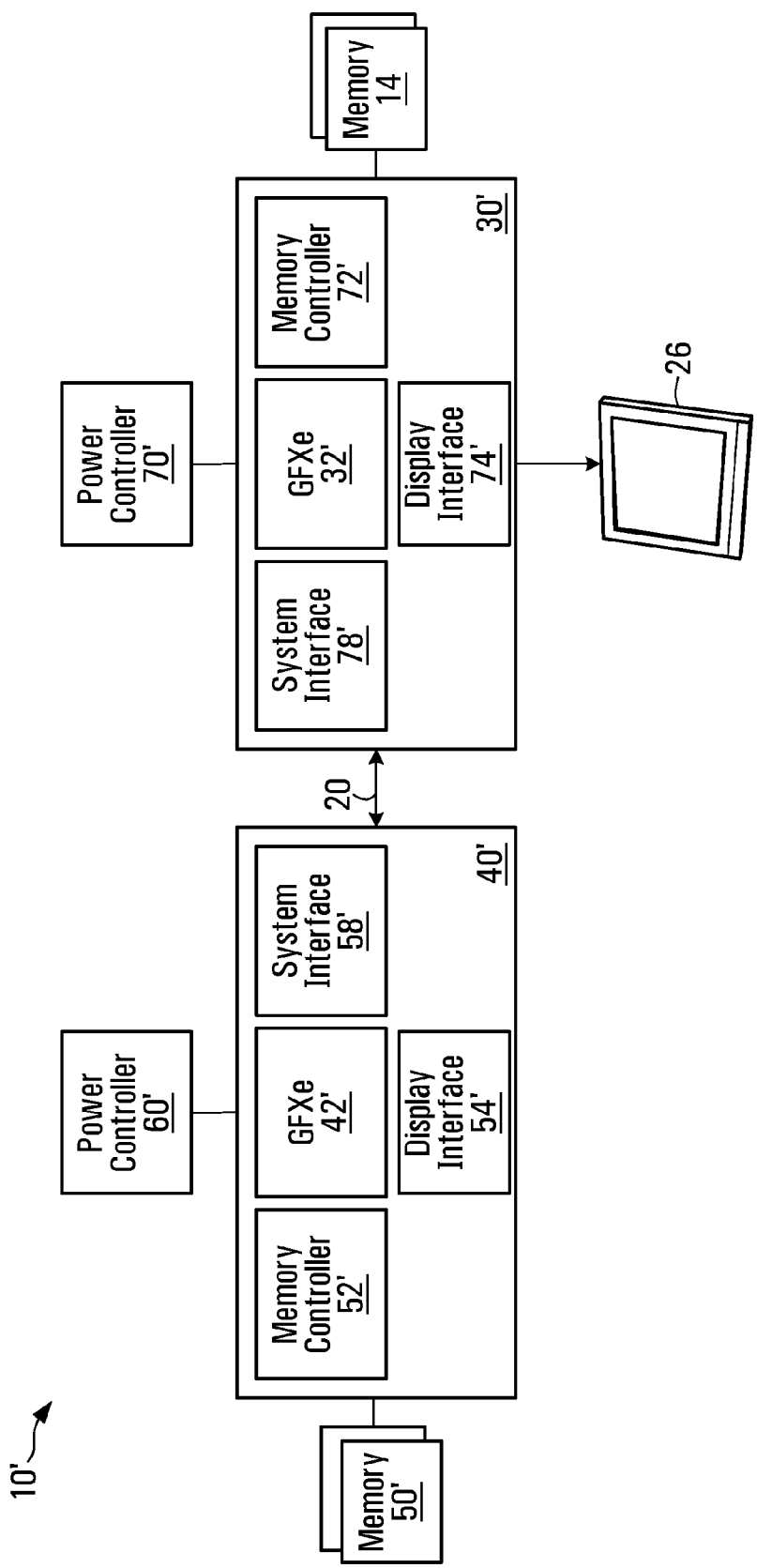
FIG. 7 is a further partial simplified schematic block diagram of portions of a computing device, exemplary of a further embodiment of the present invention.

FIG. 7 is a simplified block diagrams exemplary of a portion of a computing device 10' exemplary of another embodiment of the present invention. Computing device 10' is substantially similar to computing device 10. Components of device 10' that are functionally equivalent to components of device 10 are labelled with a prime (') symbol, and will therefore not be described in detail. Briefly, however, device 10' includes two graphics subsystem 30' and 40'. Again, graphics subsystem 30' includes a graphics engine 32', a memory controller 72', a display interface 74' and a bus interface 78'. A second graphics subsystem 40' is in communication with graphics subsystem 30', by way of high speed bus 20'. Graphics subsystem 40' includes its own graphics engine 42'; memory controller 52'; display interface 54'. Graphics subsystem 40' is further in communication with graphics memory 50'. Notably, device 10' does not include a switch used to control which of graphics subsystem 30' and graphics subsystem 40' is interconnected with display 26'. Instead, and as will become apparent, subsystem 40' is adapted to render graphics to memory 14', across bus 20'.

The organization of software controlling operation of device 10' is similar to that of device 10. However, portions of the software controlling operation of device 10' as device 10' transitions between high and low power consumption states, differ from those of device 10.

Figure 8:
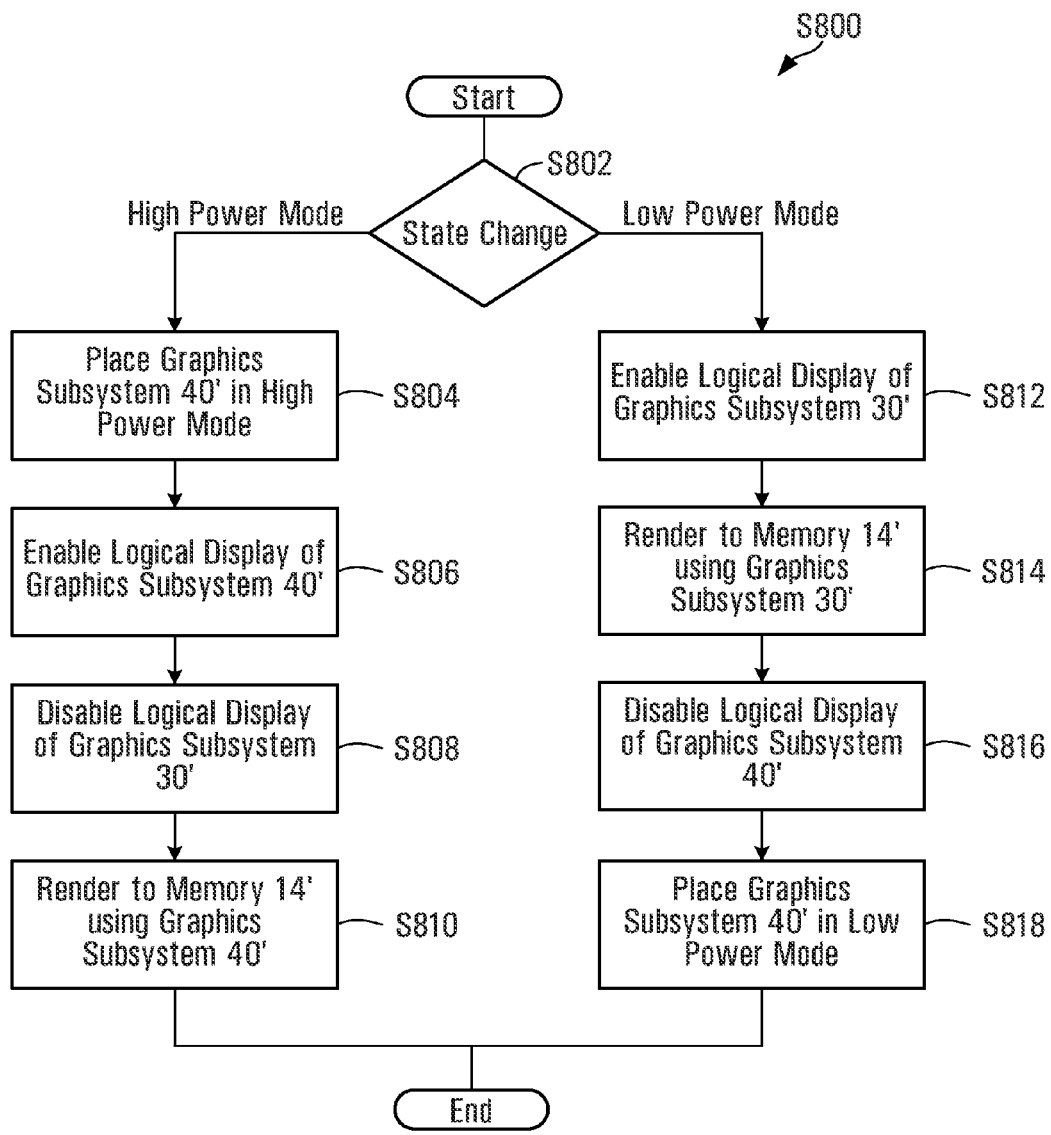
FIG. 8, is a flow chart detailing steps performed by software at the device of FIG. 6, exemplary of embodiments of the present invention.

Specifically FIG. 8 depicts software blocks S800, exemplary of embodiments of the present invention that may be performed by processor 12' under control of software within system memory of device 10'. Again, blocks S800 may be performed each time device 10' undergoes a state change, for which subsystems 30' and 40' should be configured accordingly. As illustrated, in block S802 the software determines whether device 10' should assume its higher power consumption mode, or its lower power consumption mode.

When device 10' is to resume (or transition) to its high power consumption mode, blocks S804-S810 are executed. In block S804 graphics subsystem 40' is placed in its full operational (high power consumption) mode, if it is not already in this mode. This may be performed by providing an appropriate signal to power controller 60', through the driver controlling graphics subsystem 40'. Next, graphics subsystem 40' is enabled in blocks S806 and S808. Again, this may be performed by logically disabling any display interconnected associated with graphics subsystem 30' in block S804, and logically enabling the display connected with graphics subsystem 40', in block S808. Blocks S806 and S808 may again be performed, by appropriate operating system API calls, such as the EnumDisplayDevices ( ) and ChangeDisplaySettingsEX ( ) calls described above, or through direct communication with hardware.

Notably, no physical display is connected to graphics subsystem 40'. In the absence of switch 56 (of device 10—FIG. 4), driver software controlling operation of graphics subsystem 40' is configured to render images in buffer 14' of graphics subsystem 30' instead of within associated memory 50' in step S810. Conveniently, in the presence of high speed bus 20 (embodied, for example, as the PCIe bus), such rendering is possible across bus 20, owing in part to transfer speeds enabled by the bus.

As well, the driver for graphics subsystem 30' is further configured to cause display interface 74' of graphics subsystem 30' to sample the frame buffer in memory 14', so as to present the image rendered by graphics subsystem 40' in the frame buffer in memory 14' at interconnected display 26'. At the same time, the driver for graphics subsystem 30' may direct graphics engine 32' of graphics subsystem 30' to remain substantially dormant or idle. This mode of operation is schematically depicted in FIG. 9A with only the active blocks of graphics subsystem 40' and graphics subsystem 30', crosshatched.

Figure 9A:
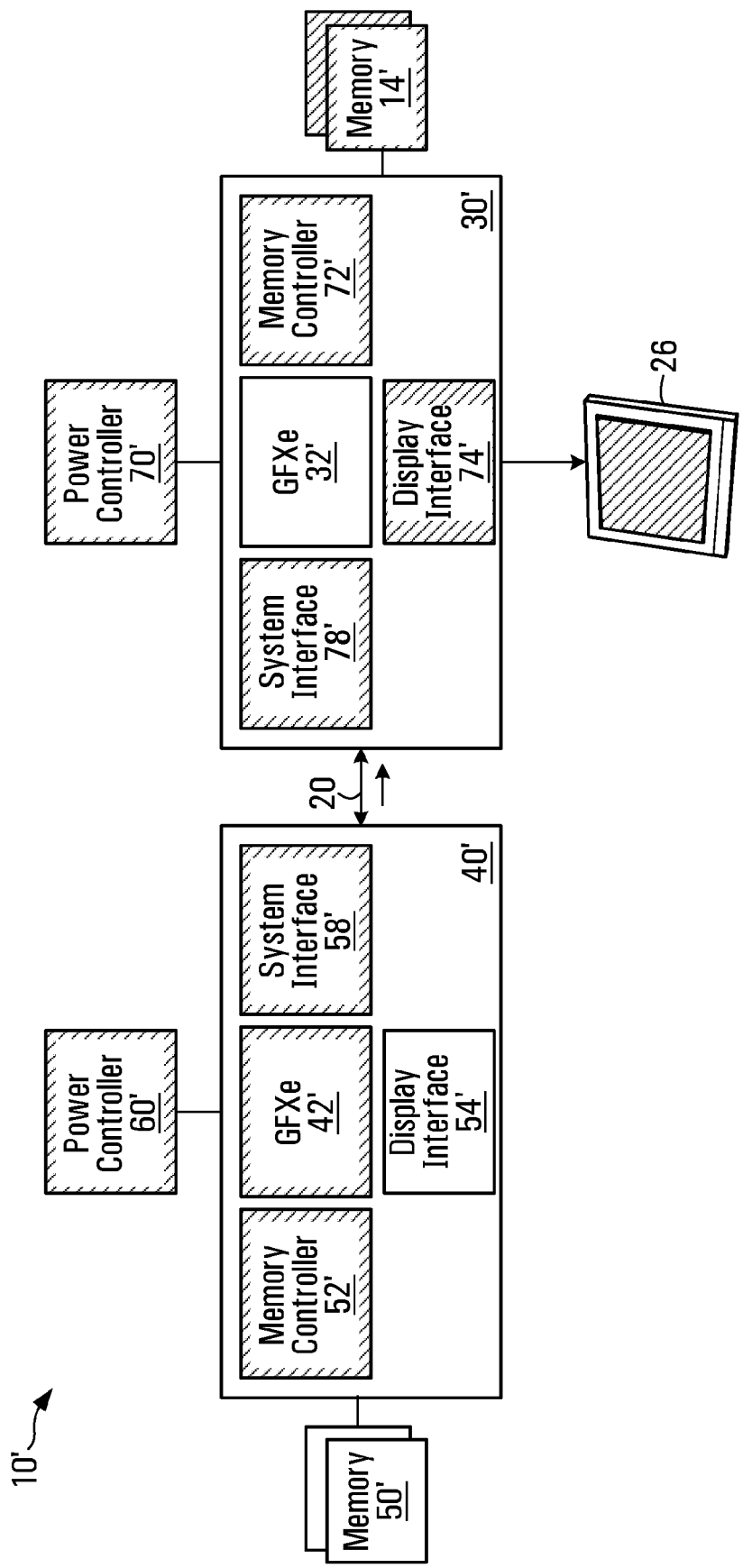
FIG. 9A, 9B are simplified block diagrams illustrating operation of the device of FIG. 7.

As will be apparent, in the embodiment of FIG. 9A memory 50' and display interface 54' are not used. As such, these functional blocks could be eliminated from subsystem 40' allowing cost reduction. Producing such a graphics subsystem may be beneficial, as subsystem 40' could be produced to complement the functionality provided by subsystem 30'. For example, subsystem could provide a graphics engine 42' that provides 3D graphics or video decoding capabilities. Graphics engine 32' may not include these capabilities. At the same time, 2D graphics abilities offered by graphics engine 32' need not be included in subsystem 40'. Consumers, in turn could add graphics subsystem 30' only when additional functionality is needed.

Figure 9B:
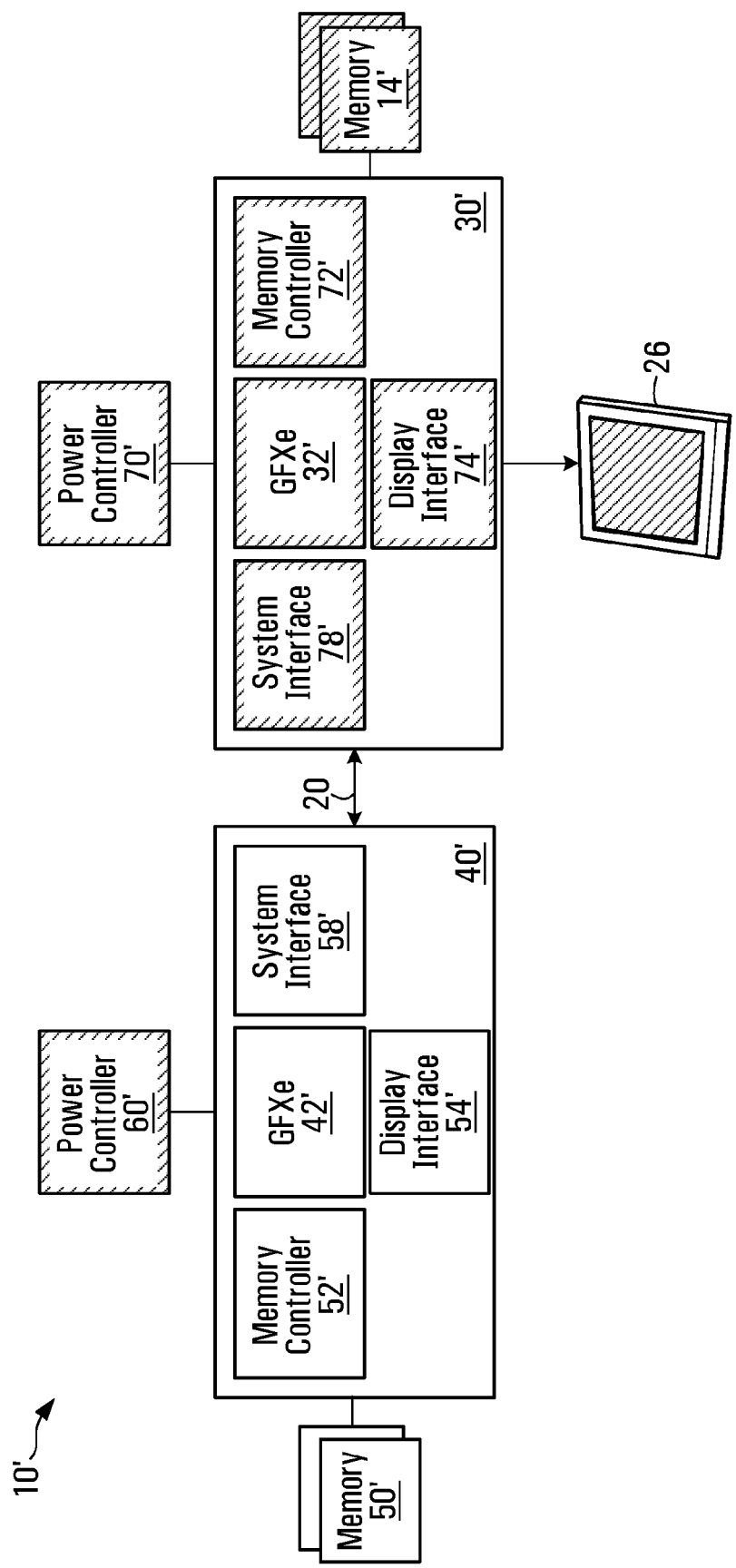

When device 10' is to transition to, or resume its low power consumption mode, blocks S812-S818 are executed. Broadly speaking, graphics subsystem 40' is partially or completely disabled and placed in its low power consumption mode, and rendering is again performed by graphics subsystem 30'. To do so, any display interconnected associated with graphics subsystem 30' may be enabled in block S812, and any display physically connected with graphics subsystem 40' may be logically disabled in block S814. Next, driver software controlling operation of graphics subsystem 30' is again configured to cause graphics subsystem 30' to render images in memory 14'. Display interface 74' continues to sample memory 14' to present images on display 26' interconnected with port 78'. As well, processor 12' first provides a suitable signal to power controller 60' in block S818, placing graphics subsystem 40' in its low power state. In its simplest form, power controller 60' disconnects power to graphics subsystem 40' or places graphics subsystem 40' into a lower power sleep mode. Again, in this lower power consumption mode, voltages are throttled, and/or all or parts of graphics subsystem 40' are powered down and/or selected clocks used by graphics subsystem 40' are slowed. Specifically, the graphics engine 42' of graphics subsystem remains idle or substantially idle (e.g. it may be slowed, disable or powered down). This mode of operation is schematically depicted in FIG. 9B with only the active functional blocks of adapter 40' and graphics subsystem 30', crosshatched. The inactive/idle functional blocks may be entirely disabled, or operated at reduced voltages or clock speeds.

Optionally, portions of graphics subsystem 30' could be disabled when graphics engine 32' is not in use. This could be facilitated by placing graphics engine 32' and other components on one or more voltage islands that may be disabled by way of a GPIO or similar circuit, any time graphics subsystem 40' is responsible for rendering images.

Other variations should also be apparent. For example, in high power modes depicted in FIGS. 9A, both graphics subsystem 30' and graphics subsystem 40' could render to memory 14' or memory 50'. In this way, the two graphics subsystems 30' and 40' may operate in concert, each rendering an alternate frame in memory 14' or rendering an alternate portion (e.g. scan-line) of each frame in memory 14'.

In yet other embodiments, additional displays may be connected to graphics subsystems 30' and 40' allowing concurrent use of multiple displays in the high power consumption modes. In this way, display interface 54 could be used to drive a second display. Upon transition to a lower power consumption mode, device 10' could be configured to operate as depicted in FIG. 9B.

Similarly, device 10' (or 10) could include multiple additional graphics subsystems connected to bus 20' (or 20), all of which could be active in the high power consumption mode, and render graphics through display interface 74' of graphics subsystem 30'. Upon transition to the lower power consumption mode, these could be disabled and rendering could be left to graphics engine 32' of graphics subsystem 30'.

Figure 10:
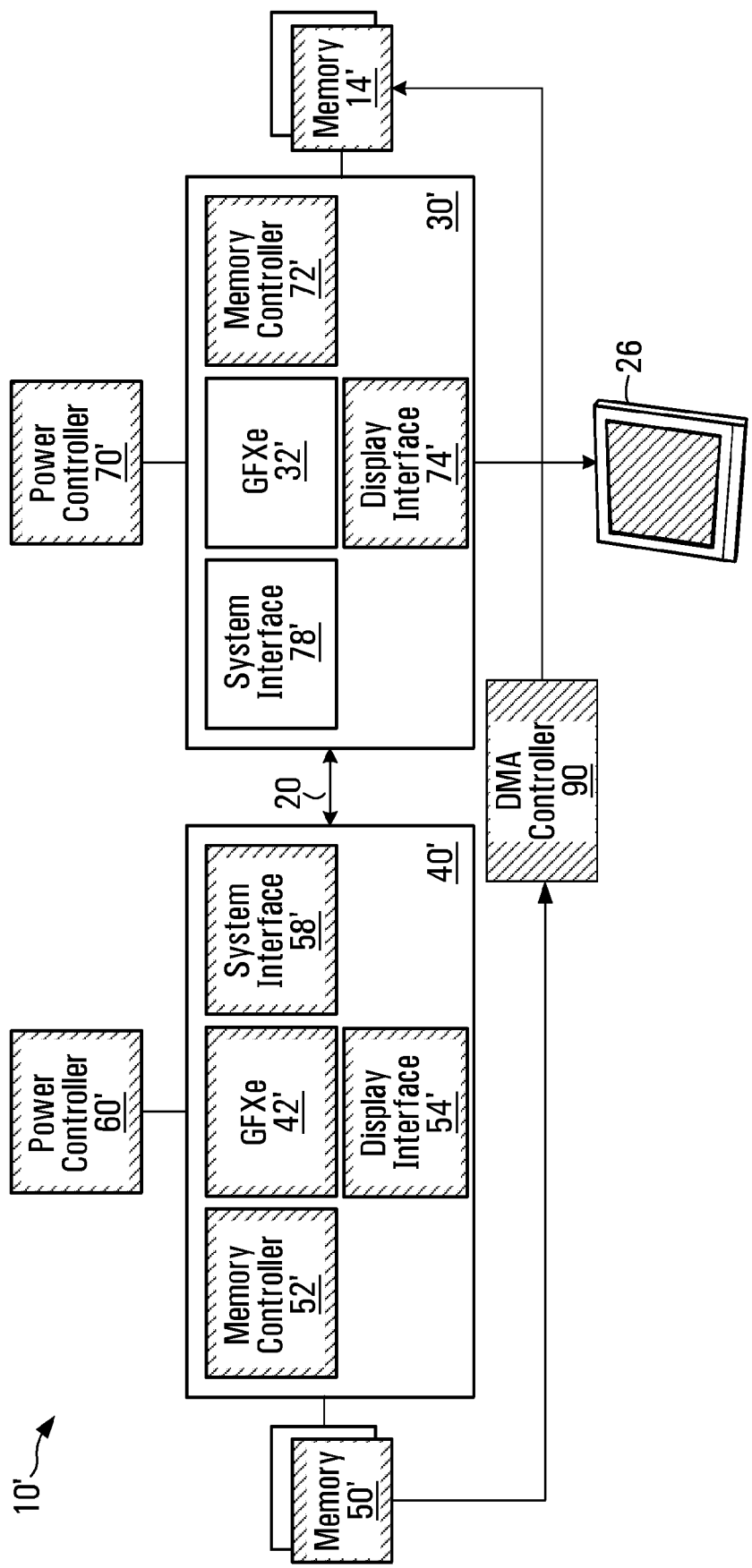
FIG. 10 is a further partial simplified schematic block diagram of portions of a computing device, exemplary of a further embodiment of the present invention.

In yet another embodiment depicted in FIG. 10, computing device 10 may include a direct memory access (DMA) controller 90. DMA controller 90 may transfer data from memory 50' to memory 14'. In this way, in a higher power consumption mode of device 10', graphics subsystem 40' could render images to memory 50'. These rendered images could then be transferred by DMA controller 90 to a frame buffer in memory 14'. DMA controller 90' could form part of graphics subsystem 30' or 40' (for example as DMA engines of graphics engines 32' or 42'), or be otherwise located in computing device 10'. Data may be transferred across bus 20' or otherwise directly from memory 50' to memory 14'. Display interface 74' would continue operating as disclosed above, sampling the frame buffer in memory 14' to present the rendered image on display 26'. Again, active blocks of device 10' of FIG. 10, in its higher power consumption mode are illustrated in crosshatch in FIG. 10.

In further embodiments, plug-and-play driver 214 (FIG. 3) could manage transitions from graphics subsystem 40 (or 40') to graphics subsystem 30 (or 30'), as a direct consequence of placing adapter 40 in its low (or off) power consumption mode. Similarly, plug-and-play driver 214 could handle re-powering of adapter 40, without the need for modifications to driver components, or an additional component 214.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. An electronic device operable in a low power consumption mode and a higher power consumption mode, said electronic device comprising:
   a processor;
   a first graphics subsystem interconnected with graphics memory and in communication with said processor;
   a second graphics subsystem interconnected with said graphics memory and in communication with said processor;
   said first graphics subsystem and said second graphics subsystem selectively operable to allow a selected one of said first and second graphics subsystems to render graphics into said graphics memory in response to at least one command from said processor;
   a display in communication with said graphics memory, to display graphics rendered to said graphics memory;
   said processor executing processor executable instructions causing said processor to transition said electronic device from said higher power consumption mode in which said second graphics subsystem renders graphics to said graphics memory, to said low power consumption mode, by selecting said first graphics subsystem to render graphics to said graphics memory, deselecting said second graphics subsystem, and placing said second graphics subsystem in said lower power consumption state.

2. An electronic device operable in a low power consumption mode and a higher power consumption mode, said electronic device comprising:
   a processor;
   a first graphics engine interconnected with graphics memory and in communication with said processor;
   a second graphics engine interconnected with said graphics memory and in communication with said processor;
   said first graphics engine and said second graphics engine selectively operable to allow a selected one of said first and second graphics engines to render graphics into said graphics memory in response to at least one command from said processor;
   a display interconnected with said graphics memory to display graphics rendered to said graphics memory;
   at least one power controller causing said device to transition from said higher power consumption mode in which said second graphics engine renders graphics to said graphics memory, to said low power consumption mode, by selecting said first graphics engine to render graphics to said graphics memory, deselecting said second graphics engine and placing said second graphics engine in said lower power consumption state.

3. The device of claim 2, wherein said device transitions from said higher power consumption mode to said low power consumption mode without restarting said device.

4. The device of claim 2, wherein said at least one power controller powers down said second graphics engine in said low power consumption mode.

5. The device of claim 2, wherein said at least one power controller throttles a clock of said second graphics engine in said low power consumption mode.

6. The device of claim 2, wherein said at least one power controller throttles a voltage of said second graphics engine in said low power consumption mode.

7. The device of claim 2, wherein said at least one power controller causes said device to transition to said low power consumption mode in response to a desired lower power consumption condition of said device.

8. The device of claim 7, wherein said desired lower power consumption condition occurs when available electrical energy is below a defined threshold, or when a graphics intensive software application terminates.

9. The device of claim 2, wherein said at least one power controller further causes said device to transition from said low power consumption mode to said higher power consumption mode in response to a desired higher power consumption condition of said device.

10. The device of claim 9, wherein said desired higher power consumption condition occurs when available electrical energy is above a defined threshold, or when a graphics intensive software application launches, or when a software application switches to a graphics intensive mode.

11. The device of claim 2, wherein in said higher power consumption mode, said first graphics engine and said second graphics engine operate in concert to render graphics to said graphics memory.

12. The device of claim 11, wherein said first graphics engine and said second graphics engine respectively render alternate portions of frames to said graphics memory in said higher power consumption mode.

13. The device of claim 12, wherein said alternate portions of frames are scan-lines.

14. The device of claim 11, wherein said first graphics engine and said second graphics engine respectively render alternate frames to said graphics memory in said higher power consumption mode.

15. A method of operating a computing device having a first graphics engine interconnected with graphics memory and in communication with a processor and a second graphics engine interconnected with said graphics memory and in communication with said processor, said first and second graphics engines selectively operable to allow a selected one of said first and second graphics engines to render graphics into said graphics memory in response to at least one command from said processor, said method comprising:
- in a higher power consumption mode, rendering graphics to be displayed on an interconnected display in said graphics memory using said second graphics engine;
- executing software to:
  - detect a desired lower power consumption condition of said computing device;
  - place said second graphics engine in a lower power consumption state in response to detecting said desired lower power consumption condition; and
  - configure said first graphics engine to render graphics to be displayed on said interconnected display in said graphics memory, while said second graphics engine is in said lower power consumption state.

16. The method of claim 15, wherein said second graphics engine is placed in said lower power consumption state without restarting said device.

17. The method of claim 15, wherein said placing said second graphics engine in said lower power consumption state comprises powering down said second graphics engine.

18. The method of claim 15, wherein said desired lower power consumption condition occurs when available electrical energy falls below a defined threshold, or when a graphics intensive software application terminates.

19. The method of claim 15, further comprising executing software in said low power consumption mode of said computing device to:
- detect a desired higher power consumption condition of said computing device;
- place said second graphics engine in a higher power consumption mode in response to detecting said desired higher power consumption condition; and
- configure said second graphics engine to render graphics in said graphics memory.

20. The method of claim 15, wherein said desired higher power consumption condition occurs when available electrical energy is above a defined threshold, or when a graphics intensive software application launches, or when a software application switches to a graphics intensive mode.

21. A power controller for controlling power consumed by a graphics subsystem in an electronic device having a first graphics subsystem interconnected with graphics memory and in communication with a processor and a second graphics subsystem interconnected with said graphics memory and in communication with said processor,
- said first graphics subsystem and said second graphics subsystem selectively operable to allow a selected one of said first and second graphics subsystems to render graphics into a frame buffer in said graphics memory in response to at least one command from a processor,
- said power controller operable to cause said second graphics subsystem to transition from a higher power consumption mode in which said second graphics subsystem renders graphics in said frame buffer, to a low power consumption mode, by placing said second graphics subsystem in said lower power consumption state while said first graphics subsystem renders graphics in said frame buffer.

22. The power controller of claim 21, wherein said power controller is operable to disconnect power to at least a part of said second graphics subsystem in said low power consumption mode.

23. The power controller of claim 21, wherein said power controller is operable to reduce voltage provided to at least a part of said second graphics subsystem in said low power consumption mode.

24. The power controller of claim 21, wherein said power controller is operable to reduce at least one of a memory clock and pixel clock of said second graphics subsystem in said low power consumption mode.

25. The power controller of claim 21, wherein said power controller is operable to cause said graphics subsystem to transition to said low power consumption mode in response to a desired lower power consumption condition, and wherein said desired lower power consumption condition occurs when said device has been substantially inactive for a defined period, or when available electrical energy is below a defined threshold, or when a graphics intensive software application has been terminated.

* * * * *